United States Patent
Joo et al.

(10) Patent No.: US 9,519,840 B2
(45) Date of Patent: Dec. 13, 2016

(54) CARDIOVASCULAR OCT IMAGE MAKING METHOD AND METHOD FOR DETECTING STENTS USING THEREOF

(71) Applicant: INDUSTRY-ACADEMIC COOPERATION FOUNDATION YONSEI UNIVERSITY, Seoul (KR)

(72) Inventors: Chulmin Joo, Goyang-si (KR); Chi Young Ahn, Daejeon (KR); Jung Heo, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 90 days.

(21) Appl. No.: 14/667,882

(22) Filed: Mar. 25, 2015

(65) Prior Publication Data
US 2015/0281544 A1   Oct. 1, 2015

(30) Foreign Application Priority Data

Mar. 25, 2014   (KR) ........................ 10-2014-0034820

(51) Int. Cl.
*G06K 9/00*   (2006.01)
*G06K 9/52*   (2006.01)
(Continued)

(52) U.S. Cl.
CPC ................ *G06K 9/52* (2013.01); *G06T 5/008* (2013.01); *G06K 9/46* (2013.01); *G06T 11/008* (2013.01);
(Continued)

(58) Field of Classification Search
None
See application file for complete search history.

(56) References Cited

U.S. PATENT DOCUMENTS 5,825,841 A * 10/1998 Timmer .................. G06T 5/008
378/4
8,921,767 B2 * 12/2014 Kang ................. G01B 9/02074
250/252.1

(Continued)

FOREIGN PATENT DOCUMENTS

JP   08-131429 A   5/1996
JP   2011-072598 A   4/2011
(Continued)

OTHER PUBLICATIONS

Wang, Ancong, et al. "Automatic stent strut detection in intravascular optical coherence tomographic pullback runs." The international journal of cardiovascular imaging 29.1 (2013): 29-38.*

(Continued)

*Primary Examiner* — Vu Le
*Assistant Examiner* — Samah Beg
(74) *Attorney, Agent, or Firm* — LRK Patent Law Firm (57) ABSTRACT

A cardiovascular OCT image making method which reduces artifacts includes the steps of: inputting a cardiovascular OCT image; converting coordinates of the inputted OCT image into two-dimensional polar coordinates (θ and r); generating a brightness control function of the A-line direction based on the blood wall relative to each θ value; forming a brightness image in the A-line direction based on the blood wall depending on the brightness control function; and forming an OCT image of which brightness is controlled by the brightness image by applying the brightness image formed on the inputted OCT image.

16 Claims, 9 Drawing Sheets

(51) Int. Cl.
*G06T 5/00* (2006.01)
*G06T 11/00* (2006.01)
*G06K 9/46* (2006.01)

(52) U.S. Cl.
CPC .............. *G06T 2207/10101* (2013.01); *G06T 2207/30052* (2013.01); *G06T 2207/30101* (2013.01)

(56) References Cited

U.S. PATENT DOCUMENTS

| | | | | |
|---|---|---|---|---|
| 9,292,918 | B2* | 3/2016 | Zagrodsky | G06T 7/0012 |
| 9,307,926 | B2* | 4/2016 | Begin | A61B 8/0841 |
| 9,347,765 | B2* | 5/2016 | Kemp | A61B 5/0066 |
| 2005/0249391 | A1* | 11/2005 | Kimmel | G06T 7/0081 |
| | | | | 382/128 |
| 2007/0167710 | A1* | 7/2007 | Unal | A61B 5/0066 |
| | | | | 600/407 |
| 2008/0181477 | A1* | 7/2008 | Izatt | A61B 3/102 |
| | | | | 382/128 |
| 2009/0268159 | A1* | 10/2009 | Xu | A61B 3/102 |
| | | | | 351/206 |
| 2010/0094127 | A1* | 4/2010 | Xu | A61B 5/0066 |
| | | | | 600/425 |
| 2015/0045661 | A1* | 2/2015 | Ryu | G09G 5/02 |
| | | | | 600/425 |
| 2016/0040977 | A1* | 2/2016 | An | G01B 9/02077 |
| | | | | 356/479 |

FOREIGN PATENT DOCUMENTS

| | | | |
|---|---|---|---|
| JP | 2012-061337 | * | 3/2012 |
| JP | 2012-061337 A | | 3/2012 |
| JP | 2012-081254 A | | 4/2012 |
| KR | 10-2012-0137329 A | | 12/2012 |
| KR | 10-2013-0134287 A | | 12/2013 |

OTHER PUBLICATIONS

Xu, Chenyang, et al. "Automatic detection of stent struts with thick neointimal growth in intravascular optical coherence tomography image sequences." Physics in medicine and biology 56.20 (2011): 6665-6675.*
Hiroyuki et al., JP2012061337, machine translation attached.*

* cited by examiner

CARDIOVASCULAR OCT IMAGE MAKING METHOD AND METHOD FOR DETECTING STENTS USING THEREOF

CROSS-REFERENCE TO RELATED APPLICATIONS

This application claims priority to Korean Application No. 10-2014-0034820, filed Mar. 25, 2014, the contents of which are incorporated herein in their entirety.

BACKGROUND

The present invention relates to a cardiovascular OCT image making method and a method for detecting stents using thereof, and, more particularly, to a cardiovascular OCT image making method and a method for detecting stents using thereof which can reduce artifacts.

An optical coherence tomography (OCT) is an optical tomography system which makes a cross section of a biological noncontact and noninvasive tissue into an image using a light source in a near infrared ray area (in a wave length range of 0.6 to 1.3 μm. The OCT is a new image photographing technology which has been studied to solve the problem of harmfulness to the human body, the price problem and the problem of measurement resolution of the existing measuring apparatuses, such as an X-ray computed tomography (CT), an ultrasound imaging system and a magnetic resonance imaging system.

The operation principle of the OCT is based on the Michelson interferometer. In the OCT, an optical signal generated from a light source splits into two optical signals in an optical coupler, and then, enter reference and sample arms. After that, reference light returning from the reference arm and sample light scattered backward from the sample arm meet together to generate interference signals, and the interference signals are treated and made into images.

The OCT is higher in resolution than the conventional ultrasonic image, can take an image of the inside of an object in a non-incisional manner, can take a tomographic image in real time, and can be manufactured into small-size and low-priced systems.

Figure 1:
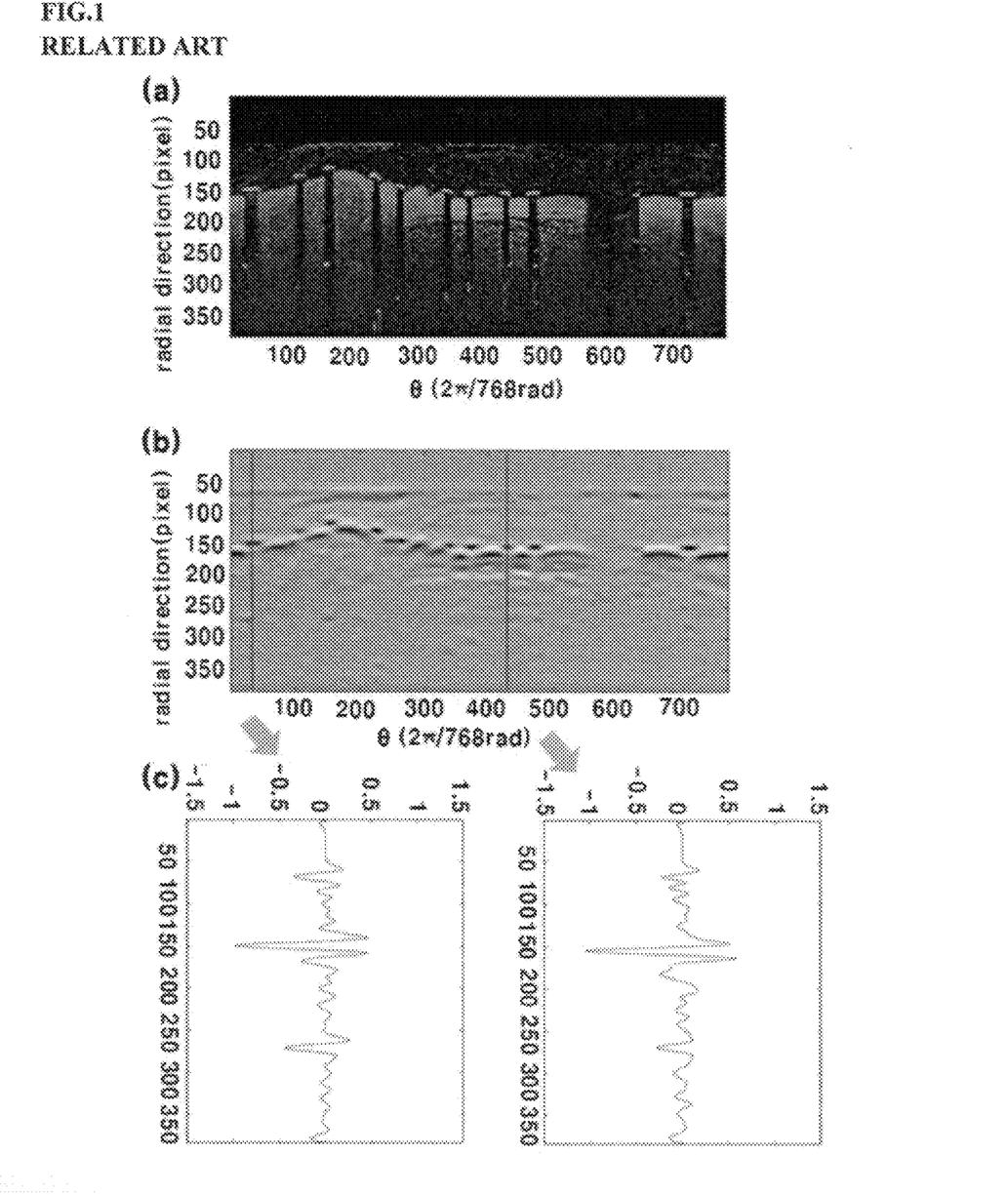
FIG. 1 is a view showing a conventional process to detect stents from an OCT image, in which artifacts are not formed.
Figure 2:
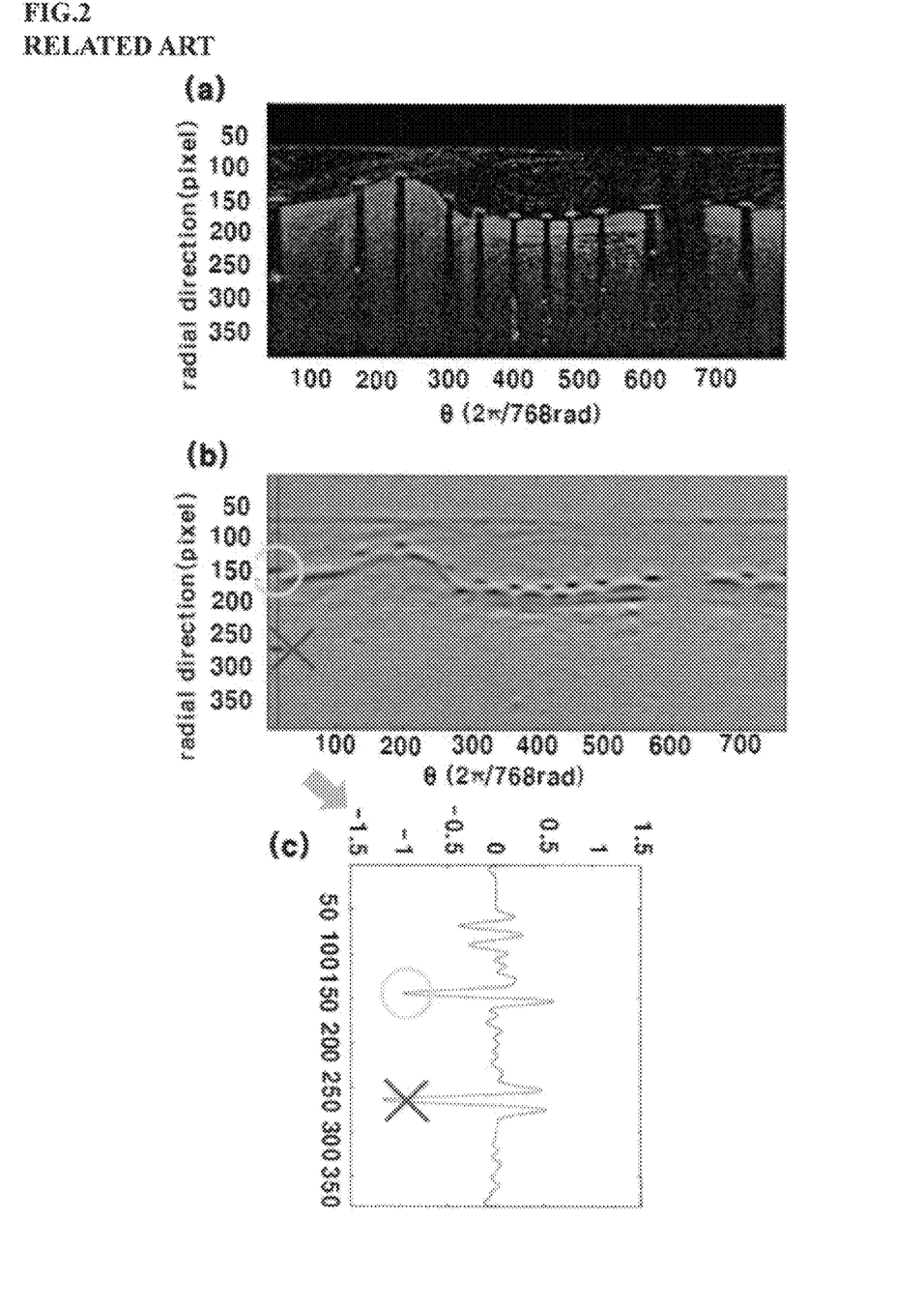
FIG. 2 is a view showing a conventional process to detect stents from an OCT image, in which artifacts are formed, in an error.

The OCT can be used to detect stents in the heart and blood vessels. FIG. 1 shows a conventional process to detect stents from an OCT image, in which artifacts are not formed, and FIG. 2 shows a conventional process to detect stents from an OCT image, in which artifacts are formed, in an error. Referring to FIGS. 1 and 2, an cardiovascular OCT image is converted into a two-dimensional plane image as shown in (a), the second derivative of a θ-direction is applied as shown in (b), and then, the second derivative of an A-line direction is applied as shown in (c) to judge a peak value into stents. In this instance, The A-line means a line photographed once when an image is formed through scan, and in FIG. 1, the radial direction corresponds to the A-line. As shown in FIG. 1, under a normal condition that artifacts are not formed, it is possible to correctly grasp the position of stents and detect the stents. However, as shown in FIG. 2, in a case that artifacts are formed, because a peak value is generated in the position where the artifacts are formed, the OCT sometimes cannot correctly grasp the position of the stents. That is, in a case that it is difficult to extract stents in the blood vessels due to multiple reflection artifacts or ghost reflection artifacts and blood residues, the influence of the artifacts must be reduced except the vicinity of the blood vessels and the stents in the image. As shown in FIGS. 1 and 2, the conventional methods can correctly grasp the position of stents when artifacts are not formed, but cannot correctly grasp the position of the stents when artifacts are formed.

BRIEF SUMMARY

It is an object of the present invention to generate a cardiovascular OCT image from which artifacts are reduced through the steps of: inputting a cardiovascular OCT image; generating a brightness control function of the A-line direction based on the blood wall relative to each θ value; forming a brightness image in the A-line direction based on the blood wall depending on the brightness control function; and forming an OCT image of which brightness is controlled by the brightness image by applying the brightness image formed on the inputted OCT image.

It is another object of the present invention to correctly extract stents by reducing artifacts through the steps of: applying the second derivative in the θ-direction to the cardiovascular OCT image from which artifacts are reduced; applying the second derivative in the A-line; and detecting a peak value of the image to which the A-line direction second derivative is applied by the stents.

It is a further object of the present invention to automatically and rapidly detect stents by repeating the entire steps from the brightness control function generating step to the brightness control function applying step for the first two-dimensional plane OCT image to the final two-dimensional plane OCT image.

It is a still further object of the present invention to copy a decrease of intensity due to an increase of distance from the blood wall boundary in a similar way to a decrease of the actual light intensity and to minimize distortion due to application of the brightness control function.

In an aspect of the present invention, there is a cardiovascular OCT image making method which reduces artifacts including the steps of: inputting a cardiovascular OCT image; converting coordinates of the inputted OCT image into two-dimensional polar coordinates (θ and r); generating a brightness control function of the A-line direction based on the blood wall relative to each θ value; forming a brightness image in the A-line direction based on the blood wall depending on the brightness control function; and forming an OCT image of which brightness is controlled by the brightness image by applying the brightness image formed on the inputted OCT image.

Moreover, the brightness control function is a Gaussian function.

Furthermore, the Gaussian function is $$W(\theta, r) := \exp\left(-\frac{(r - \mu(\theta))^2}{2\sigma^2}\right),$$

wherein μ(θ) is a position of the blood wall boundary on the A-line in the θ-direction, and σ is the minimum value of distances between the blood walls and catheters in all of the A-lines.

In another aspect of the present invention, there is a method for detecting stents using a cardiovascular OCT image which reduces artifacts including the steps of: inputting a cardiovascular OCT image; converting coordinates of the inputted OCT image into two-dimensional polar coordinates (θ and r); generating a brightness control function of the A-line direction based on the blood wall relative to each θ value; forming a brightness image in the A-line direction based on the blood wall depending on the brightness control function; forming an OCT image of which brightness is controlled by the brightness image by applying the brightness image formed on the inputted OCT image; and detecting stents from the image of which brightness is controlled.

Moreover, the brightness control function is a Gaussian function.

Furthermore, the Gaussian function is $$W(\theta, r) := \exp\left(-\frac{(r - \mu(\theta))^2}{2\sigma^2}\right),$$

wherein $\mu(\theta)$ is a position of the blood wall boundary on the A-line in the $\theta$-direction, and $\sigma$ is the minimum value of distances between the blood walls and catheters in all of the A-lines.

Additionally, the step of detecting stents includes the steps of: applying the second derivative in the $\theta$-direction to the image of which brightness is controlled; applying the second derivative in the A-line to the image to which the $\theta$-direction second derivative is applied; and detecting a peak value of the image to which the A-line direction second derivative is applied by the stents.

In a further aspect of the present invention, there is a method for automatically detecting stents using a cardiovascular OCT image which reduces artifacts including the steps of: inputting a cardiovascular OCT image; converting coordinates of the inputted OCT image into two-dimensional polar coordinates ($\theta$ and r); sensing the blood wall boundary of the first two-dimensional plane OCT image from the two-dimensional polar coordinate converted image; generating a brightness control function of the A-line direction based on the blood wall relative to each $\theta$ value; forming a brightness image in the A-line direction based on the blood wall depending on the brightness control function; forming an OCT image of which brightness is controlled by the brightness image by applying the brightness image formed on the inputted OCT image; detecting stents from the image of which brightness is controlled; and repeating the above-mentioned steps, which range from the brightness control function generating step to the stent detecting step, to the final two-dimensional plane OCT image.

In addition, the brightness control function is a Gaussian function.

Moreover, the Gaussian function is $$W(\theta, r) := \exp\left(-\frac{(r - \mu(\theta))^2}{2\sigma^2}\right),$$

wherein $\mu(\theta)$ is a position of the blood wall boundary on the A-line in the $\theta$-direction, and $\sigma$ is the minimum value of distances between the blood walls and catheters in all of the A-lines.

Furthermore, the step of detecting stents includes the steps of: applying the second derivative in the $\theta$-direction to the image of which brightness is controlled; applying the second derivative in the A-line to the image to which the $\theta$-direction second derivative is applied; and detecting a peak value of the image to which the A-line direction second derivative is applied by the stents.

In a further aspect of the present invention, there is a method for automatically detecting and displaying stents using a cardiovascular OCT image which reduces artifacts including the steps of: inputting a cardiovascular OCT image; converting coordinates of the inputted OCT image into two-dimensional polar coordinates ($\theta$ and r); sensing the blood wall boundary of the first two-dimensional plane OCT image from the two-dimensional polar coordinate converted image; generating a brightness control function of the A-line direction based on the blood wall relative to each $\theta$ value; forming a brightness image in the A-line direction based on the blood wall depending on the brightness control function; forming an OCT image of which brightness is controlled by the brightness image by applying the brightness image formed on the inputted OCT image; detecting stents from the image of which brightness is controlled; repeating the above-mentioned steps, which range from the brightness control function generating step to the stent detecting step, to the final two-dimensional plane OCT image; and displaying the detected stents.

Additionally, the brightness control function is a Gaussian function.

In addition, the Gaussian function is $$W(\theta, r) := \exp\left(-\frac{(r - \mu(\theta))^2}{2\sigma^2}\right),$$

wherein $\mu(\theta)$ is a position of the blood wall boundary on the A-line in the $\theta$-direction, and $\sigma$ is the minimum value of distances between the blood walls and catheters in all of the A-lines.

Moreover, the step of detecting stents includes the steps of: applying the second derivative in the $\theta$-direction to the image of which brightness is controlled; applying the second derivative in the A-line to the image to which the $\theta$-direction second derivative is applied; and detecting a peak value of the image to which the A-line direction second derivative is applied by the stents.

Furthermore, in the step of displaying, the two-dimensional polar coordinate converted image is returned to its original form and is displayed.

The preferred embodiments of the present invention can generate a cardiovascular OCT image from which artifacts are reduced through the steps of: inputting a cardiovascular OCT image; generating a brightness control function of the A-line direction based on the blood wall relative to each $\theta$ value; forming a brightness image in the A-line direction based on the blood wall depending on the brightness control function; and forming an OCT image of which brightness is controlled by the brightness image by applying the brightness image formed on the inputted OCT image.

Moreover, the preferred embodiments of the present invention can correctly extract stents by reducing artifacts through the steps of: applying the second derivative in the $\theta$-direction to the cardiovascular OCT image from which artifacts are reduced; applying the second derivative in the A-line; and detecting a peak value of the image to which the A-line direction second derivative is applied by the stents.

Furthermore, the preferred embodiments of the present invention can automatically and rapidly detect stents by repeating the entire steps from the brightness control function generating step to the brightness control function applying step for the first two-dimensional plane OCT image to the final two-dimensional plane OCT image.

Additionally, the preferred embodiments of the present invention can copy a decrease of intensity due to an increase of distance from the blood wall boundary in a similar way to a decrease of the actual light intensity and to minimize distortion due to application of the brightness control function.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Hereinafter, referring to the attached drawings, the structure and action of embodiments of the present invention will be described in detail.

Figure 3:
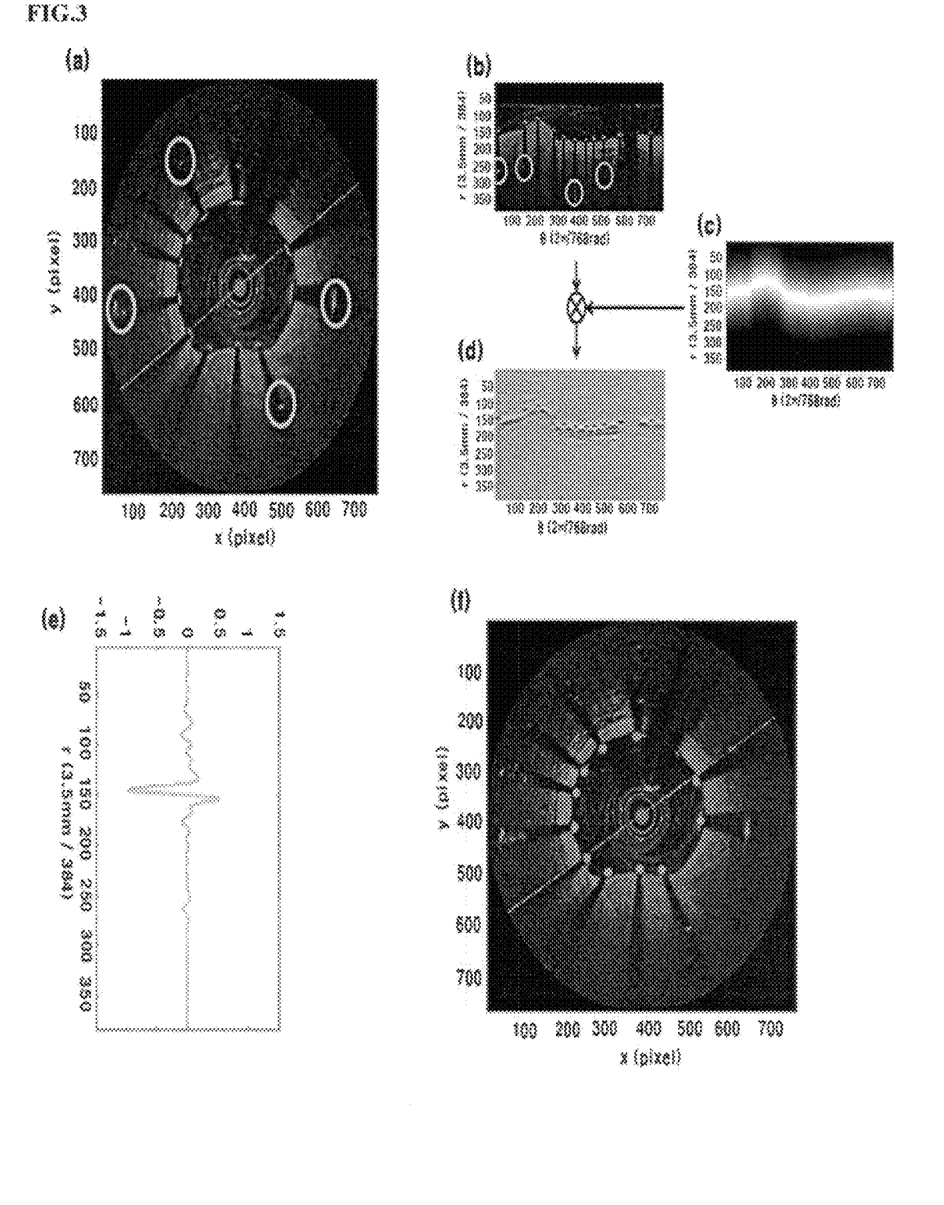
FIG. 3 is a view showing a process to reduce artifacts and detect stents by applying a brightness control function to an OCT image in which artifacts are formed according to a preferred embodiment of the present invention.

FIG. 3 is a view showing a process to reduce artifacts and detect stents by applying a brightness control function to an OCT image in which artifacts are formed according to a preferred embodiment of the present invention. In FIG. 3, (a) shows an OCT plane image, and (b) shows the form that the OCT plane image is converted into a two-dimensional polar coordinates (two-dimensional) cross section. In FIG. 3, (c) shows a brightness image generated using a brightness control function, and (d) shows a result that the second derivative of an A-line direction is applied to an image which is formed by the image of (C) applied to the image of (b). In FIG. 3, (e) shows an A-line on which stents are located in the image of (d), and a peak value is located in the position of the stents in (e). (f) shows the position of the stents formed by returning the image converted into the second polar coordinates into its original image.

One big difference of the present invention from the conventional arts is that an image formed using the brightness control function is applied to the OCT image to reduce an influence of artifacts. Therefore, a cardiovascular OCT image making method which reduces artifacts by applying an image formed by the brightness control function to the existing OCT image will be described first, and then, a method for detecting stents, a method for automatically detecting stents and a method for displaying detected stents using the cardiovascular OCT image making method will be described.

Figure 4:
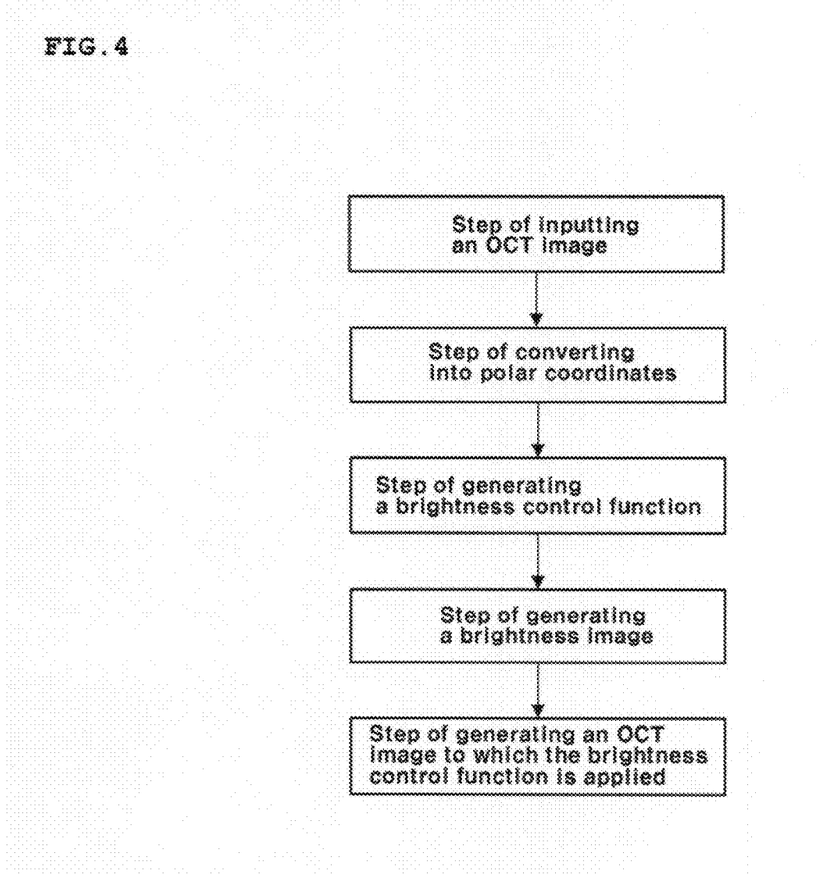
FIG. 4 is a flow chart showing a cardiovascular OCT image making method which reduces artifacts according to a preferred embodiment of the present invention.

FIG. 4 is a flow chart showing a cardiovascular OCT image making method which reduces artifacts according to a preferred embodiment of the present invention. Referring to FIG. 4, the cardiovascular OCT image making method which reduces artifacts according to the preferred embodiment of the present invention includes the steps of: inputting a cardiovascular OCT image; converting coordinates of the inputted OCT image into two-dimensional polar coordinates ($\theta$ and r); generating a brightness control function of the A-line direction based on the blood wall relative to each $\theta$ value; forming a brightness image in the A-line direction based on the blood wall depending on the brightness control function; and forming an OCT image of which brightness is controlled by the brightness image by applying the brightness image formed on the inputted OCT image.

The step of inputting the OCT image is a step of inputting an image photographed by an OCT system. In the step of inputting the OCT image, a circular blood vessels are converted and inputted into a two-dimensional cross section, and hence, it is easy to apply the brightness control function and grasp the position of stents.

The brightness control function may use the Gaussian function, and the Gaussian function can copy a decrease of intensity due to an increase of distance from the blood wall boundary in a similar way to a decrease of the actual light intensity and minimize distortion due to application of the brightness control function. Moreover, the Gaussian function does not make an impossible differentiation state even though differentiation is performed several times and even though the second derivative is used because it takes the form of Gaussian.

In the preferred embodiment of the present invention, the Gaussian function is $$W(\theta, r) := \exp\left(-\frac{(r - \mu(\theta))^2}{2\sigma^2}\right),$$

wherein $\mu(\theta)$ is a position of the blood wall boundary on the A-line in the $\theta$-direction, and $\sigma$ is the minimum value of distances between the blood walls and catheters in all of the A-lines.

When the brightness control function is generated, a brightness image is formed in the $\theta$-direction based on the blood wall.

When the formed brightness image is applied to the inputted OCT image, an image from which artifacts are reduced is outputted finally.

Figure 5:
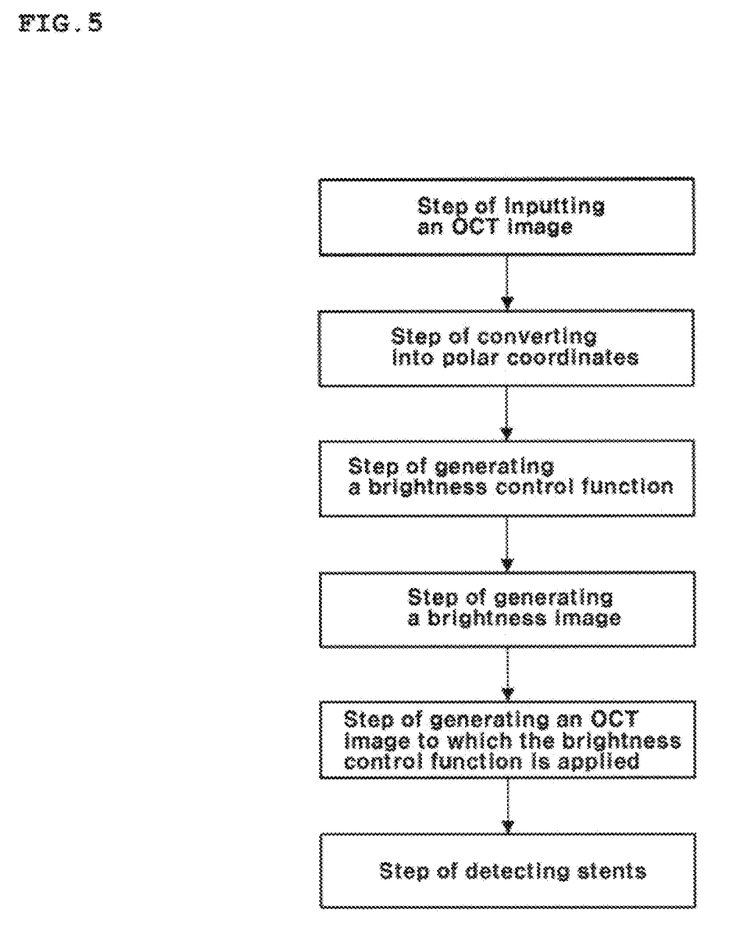
FIG. 5 is a flow chart showing a method for detecting stents using a cardiovascular OCT image from which artifacts are reduced according to a preferred embodiment of the present invention.

FIG. 5 is a flow chart showing a method for detecting stents using a cardiovascular OCT image which reduces artifacts according to a preferred embodiment of the present invention. Referring to FIG. 5, the method for detecting stents using a cardiovascular OCT image which reduces artifacts according to a preferred embodiment of the present invention includes the steps of: inputting a cardiovascular OCT image; converting coordinates of the inputted OCT image into two-dimensional polar coordinates ($\theta$ and r); generating a brightness control function of the A-line direction based on the blood wall relative to each $\theta$ value; forming a brightness image in the A-line direction based on the blood wall depending on the brightness control function; forming an OCT image of which brightness is controlled by the brightness image by applying the brightness image formed on the inputted OCT image; and detecting stents from the image of which brightness is controlled.

The stent detecting method according to the preferred embodiment of the present invention is to detect the stents from the OCT image to which the brightness control function is applied. In the step of detecting the stents, the second derivative is applied in the θ-direction to the image of which brightness is controlled, the second derivative is applied in the A-line to the image to which the θ-direction second derivative is applied, and then, a peak value of the image to which the A-line direction second derivative is applied is detected by the stents.

Figure 6:
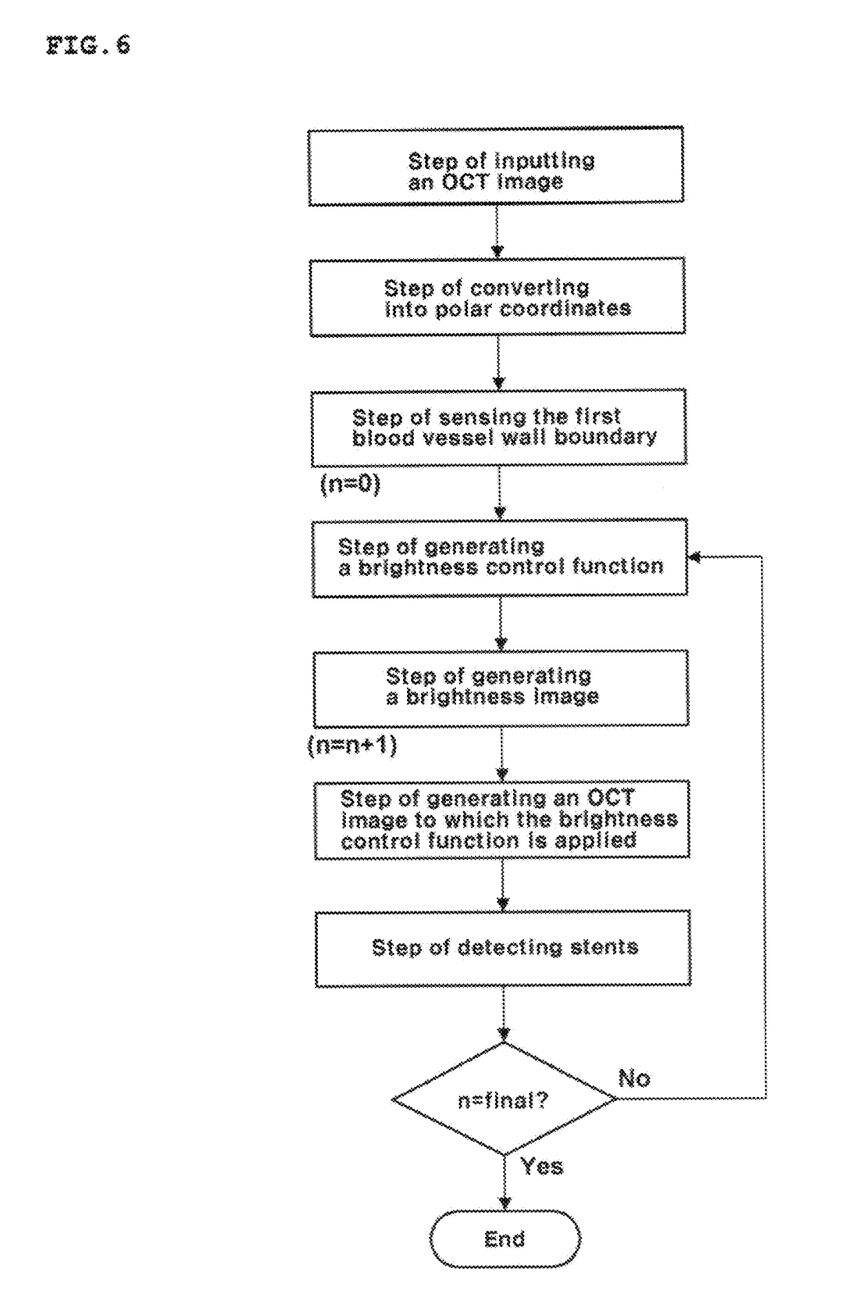
FIG. 6 is a flow chart showing a method for automatically detecting stents using the cardiovascular OCT image from which artifacts are reduced according to the preferred embodiment of the present invention.

FIG. 6 is a flow chart showing a method for automatically detecting stents using the cardiovascular OCT image from which artifacts are reduced according to the preferred embodiment of the present invention. Referring to FIG. 6, the method for automatically detecting stents using a cardiovascular OCT image which reduces artifacts according to a preferred embodiment of the present invention includes the steps of: inputting a cardiovascular OCT image; converting coordinates of the inputted OCT image into two-dimensional polar coordinates (θ and r); sensing the blood wall boundary of the first two-dimensional plane OCT image from the two-dimensional polar coordinate converted image; generating a brightness control function of the A-line direction based on the blood wall relative to each θ value; forming a brightness image in the A-line direction based on the blood wall depending on the brightness control function; forming an OCT image of which brightness is controlled by the brightness image by applying the brightness image formed on the inputted OCT image; detecting stents from the image of which brightness is controlled; and repeating the above-mentioned steps, which range from the brightness control function generating step to the stent detecting step, to the final two-dimensional plane OCT image.

That is, the method for automatically detecting the stents is repeated from the blood wall boundaries of the first two-dimensional plane OCT image to the final two-dimensional plane OCT image in the images which is converted into the two-dimensional polar coordinate so as to generate a brightness image and detect the stents. In that way, all of the stents can be automatically detected.

Figure 7:
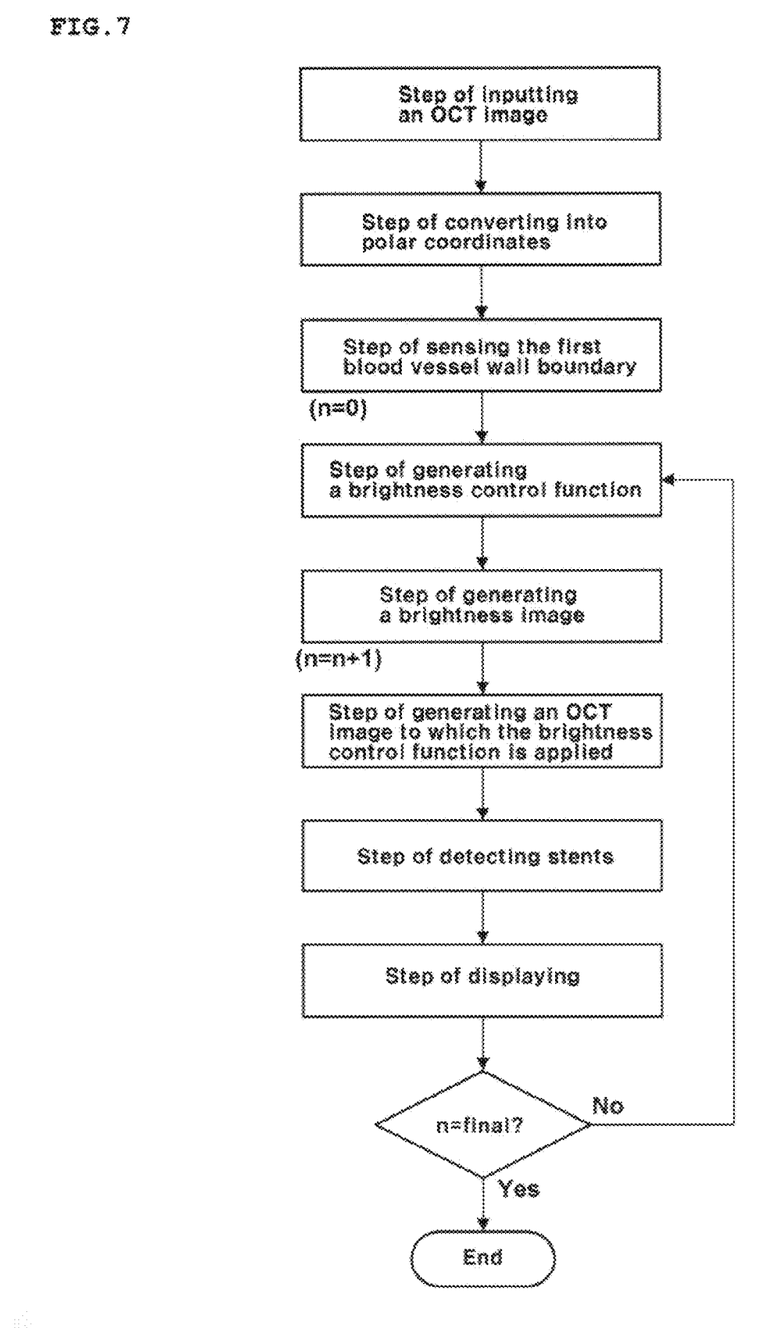
FIG. 7 is a flow chart showing a method for automatically detecting and displaying stents using the cardiovascular OCT image from which artifacts are reduced according to the preferred embodiment of the present invention.

FIG. 7 is a flow chart showing a method for automatically detecting and displaying stents using the cardiovascular OCT image from which artifacts are reduced according to the preferred embodiment of the present invention. Referring to FIG. 7, the method for automatically detecting and displaying stents using a cardiovascular OCT image which reduces artifacts according to a preferred embodiment of the present invention includes the steps of: inputting a cardiovascular OCT image; converting coordinates of the inputted OCT image into two-dimensional polar coordinates (θ and r); sensing the blood wall boundary of the first two-dimensional plane OCT image from the two-dimensional polar coordinate converted image; generating a brightness control function of the A-line direction based on the blood wall relative to each θ value; forming a brightness image in the A-line direction based on the blood wall depending on the brightness control function; forming an OCT image of which brightness is controlled by the brightness image by applying the brightness image formed on the inputted OCT image; detecting stents from the image of which brightness is controlled; repeating the above-mentioned steps, which range from the brightness control function generating step to the stent detecting step, to the final two-dimensional plane OCT image; and displaying the detected stents.

In the step of automatically detecting the stents, whenever the stents are detected, the steps of the detecting method are repeated while the stents are displayed.

Furthermore, in the step of displaying the stents, the two-dimensional polar coordinate converted image is returned to its original form and is displayed, such that a user can correctly check where the stents are located in the heart and blood vessels.

Figure 8:
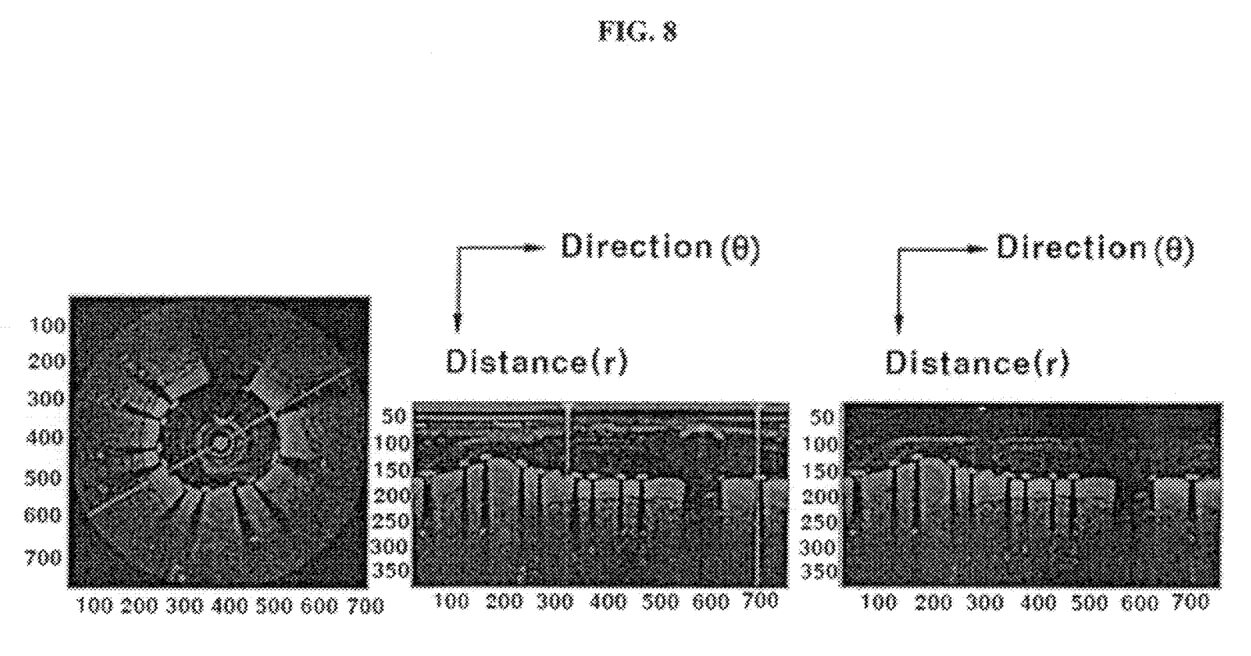
FIG. 8 shows an example of a cardiovascular OCT image.

FIG. 8 shows an example of a cardiovascular OCT image. FIG. 8(a) shows a cross section image of the inside of the circular blood vessel, and FIGS. 8(b) and 8(c) show images converted by a vertical coordinate system, wherein a horizontal axis is θ and a vertical axis is r.

Referring to FIG. 8, the meaning of the A-line mentioned in this specification will be described additionally. As shown in FIG. 8(a), the cardiovascular OCT image is an image of the cross section of the inside of the circular blood vessel. When polar coordinates which make a bright point of the central portion of the circle formed by a guide wire of an OCT endoscope as a square one are set, each point of the image may be recognized as a distance (r) and a direction (θ) from the central point. As shown in FIGS. 8(b) and 8(c), when the image is converted, the image is converted into the vertical coordinate system wherein the horizontal axis is θ and the vertical axis is r. Here, the A-line means tomographic information obtained from a special θ position in a row of the vertical axis (r-axis).

Figure 9:
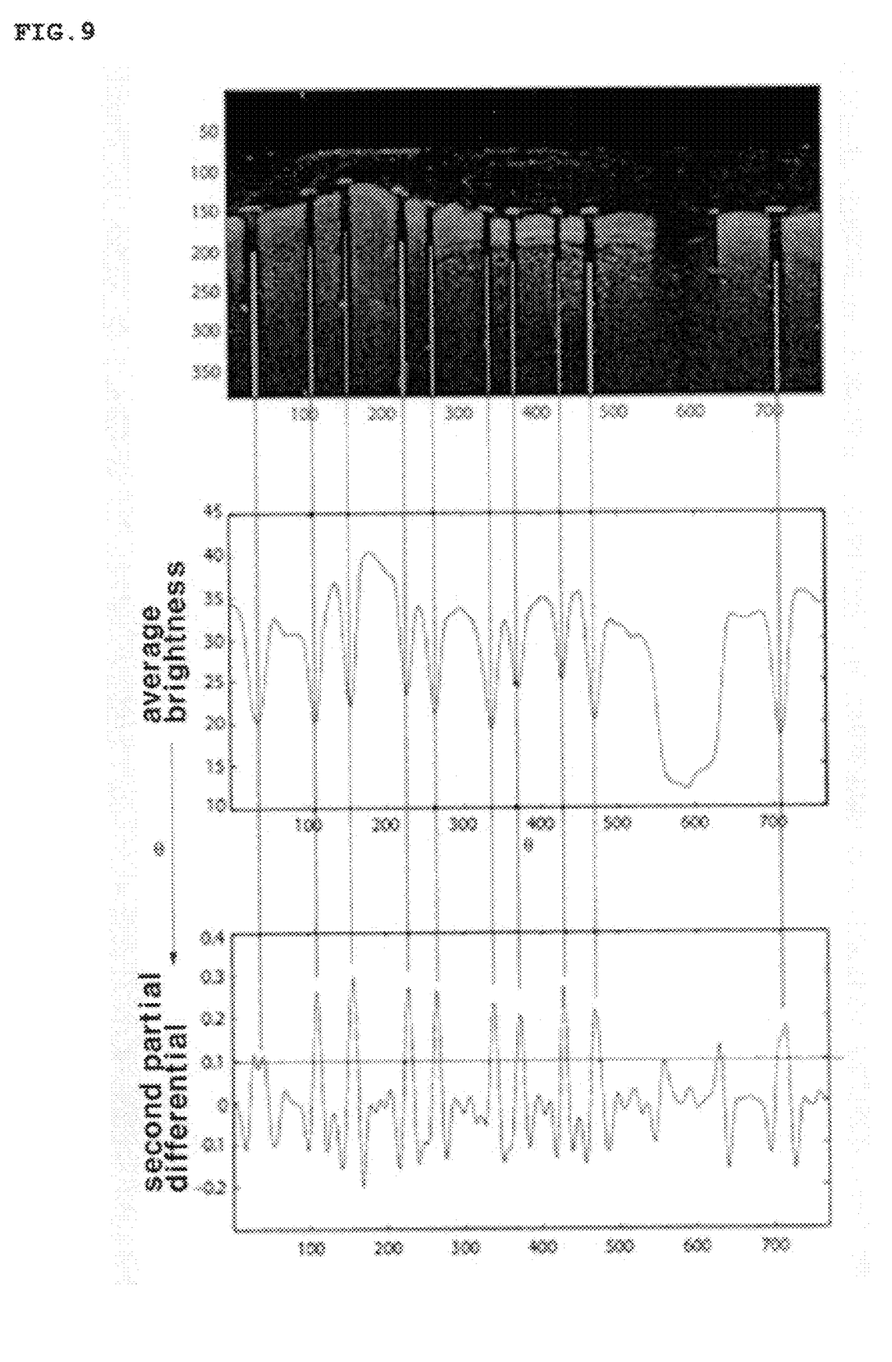
FIG. 9 shows an example that the second derivative of a $\theta$-direction is applied to a graph indicated in a cardiovascular OCT plane image.

FIG. 9 shows an example that the second derivative of a θ-direction is applied to a graph indicated in a cardiovascular OCT plane image.

Referring to FIG. 9, the expression, "the second derivative of a θ-direction is applied to a graph indicated in a cardiovascular OCT plane image", means that a graph of an average brightness shown in FIG. 9 can be obtained when the average of brightness of the corresponding image is calculated relative to the r-direction in a case that the cardiovascular OCT plane image, in which the horizontal axis is θ and the vertical axis is r, shown in FIG. 9 is set. Here, shadows are formed at portions where the stents exist because light is hidden, and hence, the average brightness is reduced remarkably. In this instance, because it is difficult to distinguish the stents from the shadows generated by the guide wires of the stents when the user sees the portions where the average brightness is reduced, calculation of the second derivative is carried out relative to the average brightness profile (See FIG. 9(b)) in order to distinguish only the stents.

FIG. 9(c) shows a graph that calculation of the second derivative is carried out relative to the average brightness signal in the angular direction, namely, in the θ-direction. Here, because just peaks with a sufficiently narrow width are taken, the stents can be distinguished.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A cardiovascular OCT image making method which reduces artifacts comprising steps of:
   inputting a cardiovascular OCT image;
   converting coordinates of the inputted OCT image into two-dimensional polar coordinates (θ and r);
   generating a brightness control function of an A-line direction based on a blood wall relative to each θ value;
   forming a brightness image in the A-line direction based on the blood wall and depending on the brightness control function; and
   forming an OCT image of which brightness is controlled by the brightness image by applying the brightness image formed on the inputted OCT image.

2. The cardiovascular OCT image making method according to claim 1, wherein the brightness control function is a Gaussian function.

3. The cardiovascular OCT image making method according to claim 2, wherein the Gaussian function is $$W(\theta, r) := \exp\left(-\frac{(r-\mu(\theta))^2}{2\sigma^2}\right),$$

wherein μ(θ) is a position of a blood wail boundary on the A-line in a θ-direction, and σ is a minimum value of distances between the blood wall and a catheter in each A-line.

4. A method for detecting stents using a cardiovascular OCT image which reduces artifacts comprising steps of:
   inputting a cardiovascular OCT image;
   converting coordinates of the inputted OCT image into two-dimensional polar coordinates (θ and r);
   generating a brightness control function of an A-line direction based on a blood wall relative to each θ value;
   forming a brightness image in the A-line direction based on the blood wall and depending on the brightness control function;
   forming an OCT image of which brightness is controlled by the brightness image by applying the brightness image formed on the inputted OCT image; and
   detecting stents from the image of which brightness is controlled.

5. The method for detecting stents using a cardiovascular OCT image according to claim 4, wherein the brightness control function is a Gaussian function.

6. The method for detecting stents using a cardiovascular OCT image according to claim 5, wherein the Gaussian function is $$W(\theta, r) := \exp\left(-\frac{(r-\mu(\theta))^2}{2\sigma^2}\right),$$

wherein μ(θ) is a position of a blood wall boundary on the A-line in a (θ)-direction, and σ is a minimum value of distances between the blood wall and a catheter in each A-line.

7. The method for detecting stents using a cardiovascular OCT image according to claim 4, wherein the step of detecting stents comprises steps of:
   applying a second derivative in a θ-direction to the image of which brightness is controlled;
   applying a second derivative in the A-line direction to the image to which the θ-direction second derivative is applied; and
   detecting the stents by detecting a peak value of the image to which the A-line direction second derivative is applied.

8. A method for automatically detecting stents using a cardiovascular OCT image which reduces artifacts comprising steps of:
   inputting a cardiovascular OCT image;
   converting coordinates of the inputted OCT image into two-dimensional polar coordinates (θ and r);
   sensing a blood wall boundary of a first two-dimensional plane OCT image from the two-dimensional polar converted image;
   generating a brightness control function of an A-line direction based on the blood wall relative to each θ value;
   forming a brightness image in the A-line direction based on the blood wall and depending on the brightness control function;
   forming an OCT image of which brightness is controlled by the brightness image by applying the brightness image formed on the inputted OCT image;
   detecting stents from the image of which brightness is controlled; and
   repeating the above-mentioned steps, which range from the brightness control function generating step to the stent detecting step, to a final two-dimensional plane OCT image.

9. The method for automatically detecting stents using a cardiovascular OCT image according to claim 8, wherein the brightness control function is a Gaussian function.

10. The cardiovascular OCT image making method according to claim 9, wherein the Gaussian function is $$W(\theta, r) := \exp\left(-\frac{(r-\mu(\theta))^2}{2\sigma^2}\right),$$

wherein μ(θ) is a position of a blood wall boundary on the A-line in a θ-direction, and σ is a minimum value of distances between the blood wall and a catheter in each A-line.

11. The method for automatically detecting stents using a cardiovascular OCT image according to claim 8, wherein the step of detecting stents comprises steps of:
   applying a second derivative in a θ-direction to the image of which brightness is controlled;
   applying a second derivative in the A-line direction to the image to which the θ-direction second derivative is applied; and
   detecting the stents by detecting a peak value of the image to which the A-line direction second derivative is applied.

12. A method for automatically detecting and displaying stents using a cardiovascular OCT image which reduces artifacts comprising steps of:
   inputting a cardiovascular OCT image;
   converting coordinates of the inputted OCT image into two-dimensional polar coordinates (θ and r);

sensing a blood wall boundary of a first two-dimensional plane OCT image from the two-dimensional polar converted image;

generating a brightness control function of an A-line direction based on the blood wall relative to each θ value;

forming a brightness image in the A-line direction based on the blood wall and depending on the brightness control function;

forming an OCT image of which brightness is controlled by the brightness image by applying the brightness image formed on the inputted OCT image;

detecting stents from the image of which brightness is controlled;

repeating the above-mentioned steps, which range from the brightness control function generating step to the stent detecting step, to a final two-dimensional plane OCT image; and displaying the detected stents.

13. The method for automatically detecting and displaying stents using a cardiovascular OCT image according to claim 12, wherein the brightness control function is a Gaussian function.

14. The method for automatically detecting and displaying stents using a cardiovascular OCT image according to claim 13, wherein the Gaussian function is $$W(\theta, r) := \exp\left(-\frac{(r - \mu(\theta))^2}{2\sigma^2}\right),$$

wherein $\mu(\theta)$ is a position of a blood wall boundary on the A-line in a θ-direction, and σ is a minimum value of distances between the blood wall and a catheter in each A-line.

15. The method for automatically detecting and displaying stents using a cardiovascular OCT image according to claim 12, wherein the step of detecting stents comprises steps of:

applying a second derivative in a θ-direction to the image of which brightness is controlled;

applying a second derivative in the A-line direction to the image to which the θ-direction second derivative is applied; and detecting the stents by detecting a peak value of the image to which the A-line direction second derivative is applied.

16. The method for automatically detecting and displaying stents using a cardiovascular OCT image according to claim 12, wherein in the step of displaying, the two-dimensional polar coordinate converted image is returned to its original form and is displayed.

* * * * *